Feb. 4, 1958 J. P. BARRETT ET AL 2,822,296
RODENT REPELLENT MATERIAL CONTAINING DODECYLAMINE ACETATE
Filed Nov. 1, 1951 4 Sheets-Sheet 1
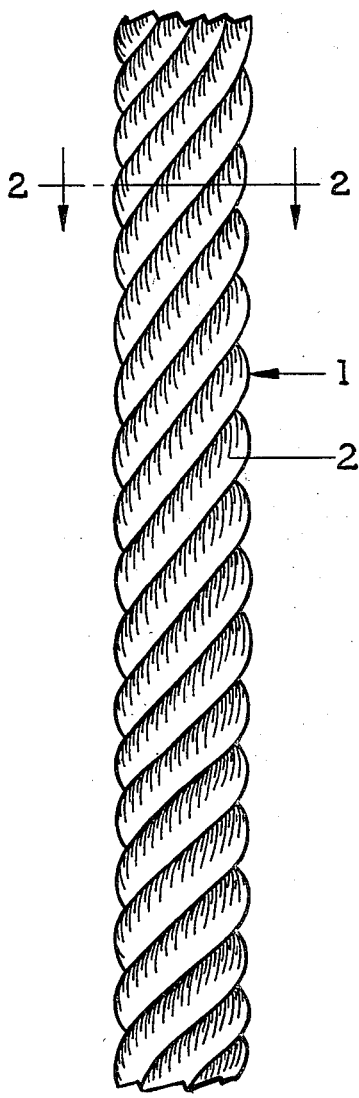
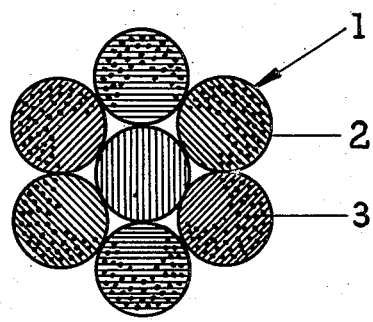
INVENTORS:
JOHN P. BARRETT AND
ERVIN W. SEGEBRECHT
BY Carl C. Batz
ATTORNEY Feb. 4, 1958 J. P. BARRETT ET AL 2,822,296
RODENT REPELLENT MATERIAL CONTAINING DODECYLAMINE ACETATE
Filed Nov. 1, 1951 4 Sheets-Sheet 2
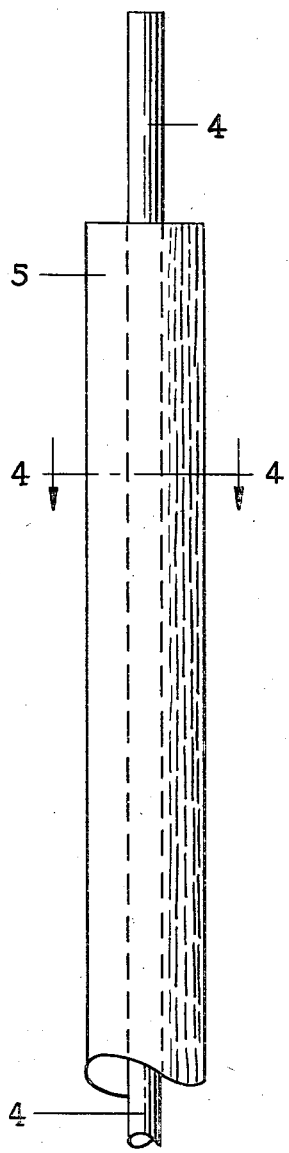
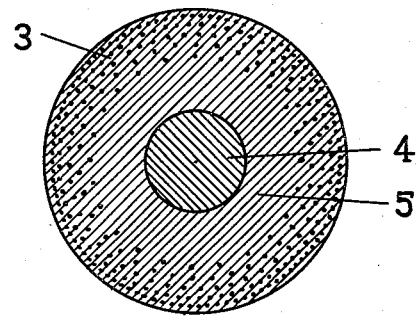
INVENTORS:
JOHN P. BARRETT AND
ERVIN W. SEGEBRECHT
BY Carl C. Batz
ATTORNEY Feb. 4, 1958     J. P. BARRETT ET AL     2,822,296
RODENT REPELLENT MATERIAL CONTAINING DODECYLAMINE ACETATE
Filed Nov. 1, 1951     4 Sheets-Sheet 3

INVENTORS:
JOHN P. BARRETT AND
ERVIN W. SEGEBRECHT

BY *Carl C. Batz*

ATTORNEY

FIG. 7
FIG. 8
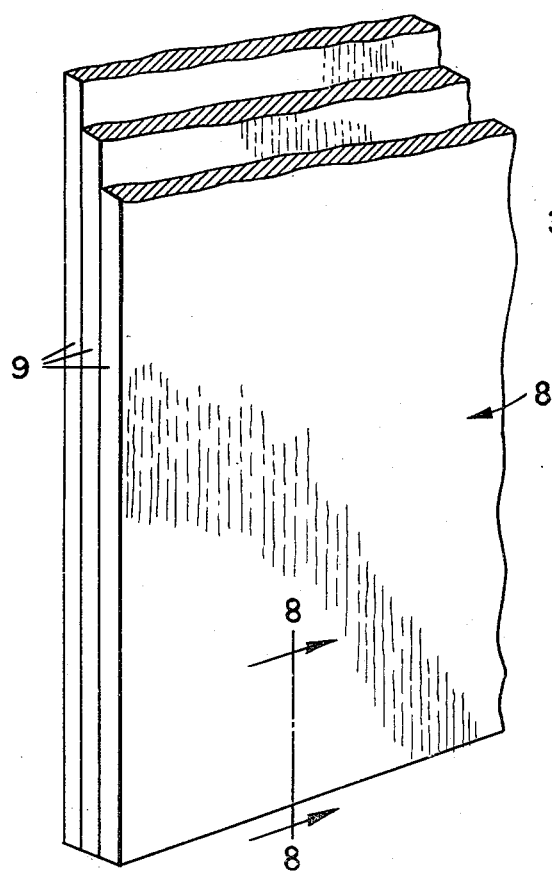
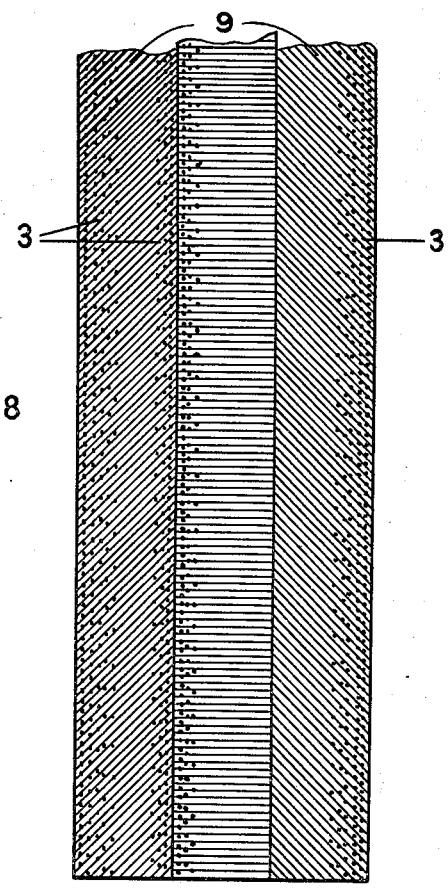
INVENTORS:
JOHN P. BARRETT AND
ERVIN W. SEGEBRECHT

United States Patent Office 2,822,296
Patented Feb. 4, 1958

2,822,296

RODENT REPELLENT MATERIAL CONTAINING DODECYLAMINE ACETATE

John P. Barrett and Ervin W. Segebrecht, Chicago, Ill., assignors to Armour and Company, Chicago, Ill., a corporation of Illinois Application November 1, 1951, Serial No. 254,395

11 Claims. (Cl. 117—138.5)

This invention relates to fabrication materials having rodent repellent characteristics. The invention is especially useful in connection with wrapping and container materials, cordage including binder twine, wrapping cord, ropes and hawsers, and similar rope and twine, electrical and other cables and conductors, and fabrication boards such as paper boards, pressed fibrous boards, paper reinforced boards, fiber boards reinforced with inert filler materials, laminated boards, corrugated paper boards and other boards used in the fabrication of cartons, shipping containers, and boards used in building construction or in the interior finishing of buildings, etc.

The protection of fabrication material and the like against rodent attack and destruction presents a problem of major significance. Great damage is suffered annually because of rodents gnawing through fabrication materials, cordage, electrical insulation and the like. In the case of grains and other food products which are stored in textile bags and other wrappers or containers there is loss resulting from the cutting of holes in such containers by rats and mice. There is similar damage wrought in the case of cordage—as in instances where grain is tied in bundles with binder twine, the cutting of twine by field mice or rats results in a loss of grain and greatly increases the labor required in handling the broken bundles. The damage to ship ropes and other ropes by rodents represents a large annual loss. In the case of electrical insulation, rats, squirrels, and other rodents frequently destroy the insulative material about electrical conductors and thereby create fire hazards.

Attempts to prevent damage by rodents have usually consisted in applying toxic substances or disagreeable tasting substances to the vulnerable article. This is not a practical solution to the problem since the rodents attack readily and accomplish extensive damage before the above substances exert their desired effect. Another common method of extermination is by the use of toxic gases. This method is often ineffective especially in open and inaccessible areas. A further disadvantage of the above chemical materials is that they are usually toxic to humans and domestic animals and cannot therefore be safely employed in connection with food materials. Still a further disadvantage is that certain of the above chemical materials impart undesirable structural characteristics to the treated article as in the case of cordage where certain materials incorporated therein render it stiff and unsatisfactory as a flexible member.

An object of the present invention is to provide fabrication material which is rendered repellent to rodents to the extent that rodents do not approach the material or attempt to gnaw it. Yet another object is to produce a fabrication board structure useful in the forming of containers and other structures, and in the construction or finishing of buildings, etc., the board being provided permanently with a protective body of material repellent to rodents. Still another object is to provide a wrapper or bag effectively penetrated by and impregnated with a material which remains solid under normal conditions and which is repellent to rodents. Still another object is to provide a wrapper or container which is rendered highly flexible and sturdy through the application thereto of oil containing dodecylamine acetate whereby the bag is rendered rodent repellent. Yet another object is to provide cordage which retains its flexibility and which effectively repels rodents. Still another object is to provide binder twine, rope, and other cordage material which is rendered rodent repellent by the incorporation therein of a relatively small amount of dodecylamine acetate. Still a further object of the present invention is to provide electrical cable which is repellent to rodents. Still another object is to provide an electrical cable having a conductor enclosed by an insulative sheathing in which there is incorporated dodecylamine acetate rendering the sheathing repellent to rodents, while at the same time preserving the flexibility of the cable. Other specific objects and advantages will appear as the specification proceeds.

Illustrative embodiments of the invention are shown in the accompanying drawing, in which Figure 1 is a top plan view of a cord impregnated with dodecylamine acetate in accordance with our invention;

Figure 2 is a transverse sectional view of the cord showing the twisted strands which form the cord and showing the impregnation thereof with dodecylamine acetate;

Figure 3 is a top plan view of a cable, the sheathing of which is impregnated or coated with dodecylamine acetate in accordance with our invention;

Figure 4 is an enlarged transverse sectional view of the cable, the section being taken as indicated at line 4—4 of Figure 3;

Figure 7 is a broken perspective view of a board treated with rodent repellent material; and Figure 8 is a broken edge view in elevation of the laminated board structure shown in Figure 7.

Figure 5:
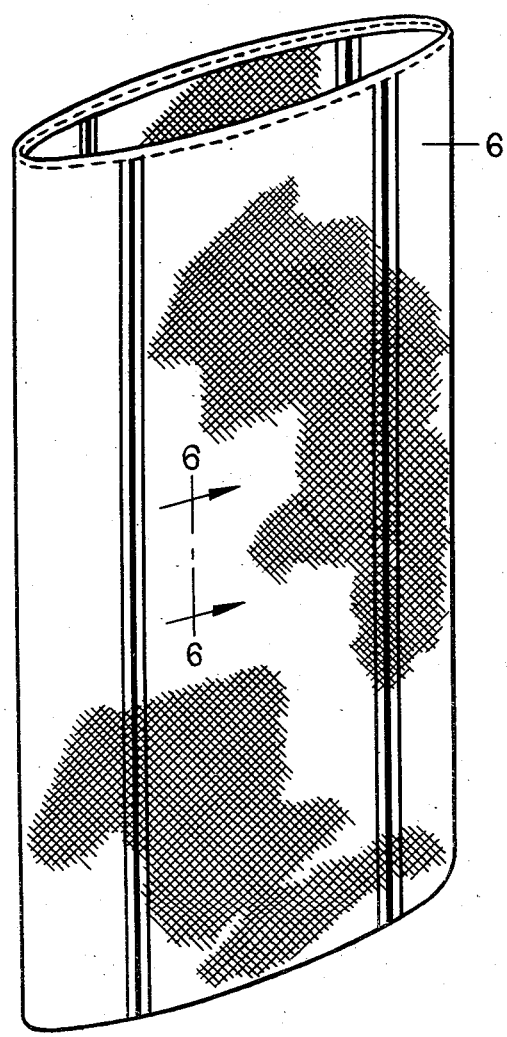
Figure 5 is a perspective view of a textile bag containing rodent repellent material in accordance with our invention.

As illustrated in Figures 1 and 2, the numeral 1 designates a cord formed by strands 2 which are twisted together. The cord is impregnated with dodecylamine acetate, as indicated by dots 3 in Figure 2.

In this embodiment of our invention, dodecylamine acetate is reduced to fluid condition and applied to the cord by spraying or dipping the cord therein, etc. We prefer to dissolve the dodecylamine acetate in mineral oil, cordage oil, etc., and to apply the oil mixture to the cordage by spraying, dipping, etc.

As a specific example, a 50% solution of dodecylamine acetate in light mineral oil was used to impregnate binder twine. The binder twine was dipped in the solution and then exposed to rats and other rodents to test the effectiveness of the twine as a rodent repellent, as will be later described.

We have found that an effective solution for treating the cord may consist of from 3% to 10% of the dodecylamine acetate by weight based upon the cordage oil used. Larger amounts may be used, but highly satisfactory results have been obtained where the dodecylamine acetate is from 3% to 10% of the cordage oil by weight and preferably within the range of from 5% to 10% of the cordage oil.

When the dodecylamine acetate is applied without the use of cordage oil, the dodecylamine acetate may be used in the same percentages as set out above, the oil of course, being omitted.

In another embodiment of our invention as shown in Figures 3 and 4, the numeral 4 designates a metallic conductor enclosed by a sheathing or coating 5; and in the enlarged view shown in Figure 4, the dots 3 designate the dodecylamine acetate applied to the sheathing.

In this embodiment of our invention, we incorporate dodecylamine acetate in a sheathing material 5 about the electrical conductor 4, the dodecylamine acetate being preferably from 3% to 10% of the sheathing composition on a weight basis. The dodecylamine acetate may be incorporated in a coating composition for the cable. The coating may be of any suitable material. The coating or sheathing composition about the conductor may consist of asphalt, tar, pitch, or other preferably low melting bitumens. The dodecylamine acetate may be applied to the exterior of the sheath 5 by spraying, dipping, etc., or, if desired, the dodecylamine acetate may be combined with the bitumen, resin, rubber composition, or other sheath-forming material prior to the application of the sheath-forming material to the conductor. It is sufficient for the purpose of the invention that there be a coating around the conductor or sheathing therefor containing the dodecylamine acetate.

The dodecylamine acetate may be heated for incorporating the same within the coating solution, or it may be dissolved in a solvent which in turn is mixed with the coating solution.

As a specific example of the application of dodecylamine acetate to an electrical cable, the following may be set forth: The cable was dipped momentarily in 100% melted dodecylamine acetate to obtain a thin film over the entire outer surface thereof. The film hardened quickly at room temperature. The weight of the cable before treatment was 7.150 grams and after treatment was 7.257 grams. The weight of the dodecylamine acetate was 1.50% of the original weight of the cable. Testing of the cable with respect to rodent-repellent characteristics is described hereinafter.

Another embodiment of our invention is illustrated by Figure 5 in which a container or bag 6 is shown. The container may be formed by any suitable material such as jute, cotton, or other textile materials and may be of any suitable shape or form. The container may be in the form of a sack or bag or it may be in the form of a wrapper to be stitched about grain or other products.

Figure 6:
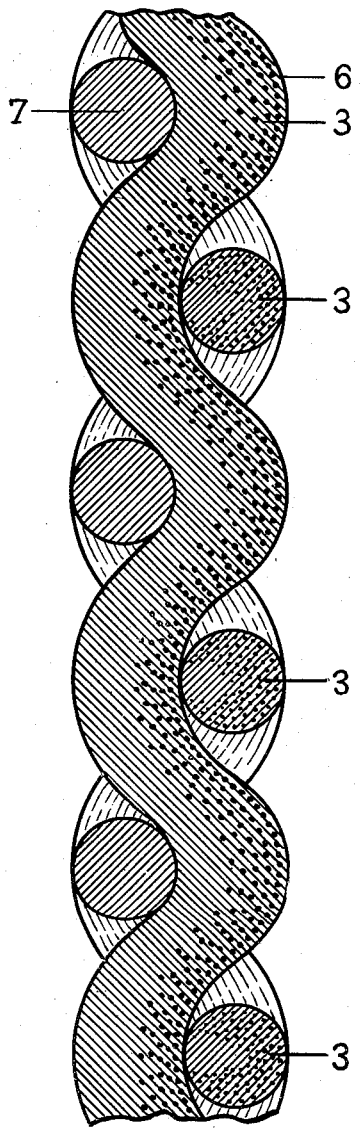
Figure 6 is a greatly enlarged detail sectional view of the bag, the section being taken at line 6—6 of Figure 5 and showing a portion of the threads containing the rodent repellent material.

As shown more clearly in Figure 6, the bag 6 comprises a plurality of interwoven individual textile threads 7 which are impregnated with dodecylamine acetate indicated by dots 3.

Dodecylamine acetate is normally solid and in order to incorporate it within the wrapper or bag, it is necessary first to heat the dodecylamine acetate above its melting point so as to form a liquid, and then the textile material may be impregnated by dipping it within the liquid, by spraying the liquid upon the textile material, or by other well-known methods.

Dodecylamine acetate is particularly effective as a penetrating agent for textiles and when in liquid condition is readily dispersed within the textile body. Upon cooling, the solid particles are effectively retained within the textile body for long periods of time. With isopropyl alcohol, alcohol, or cordage oil, the dodecylamine acetate is even more rapidly carried into the interior of the threads or cords forming the textile body and the particles remain within the body to insure its repellency to rodents for an indefinite period.

If desired, the dodecylamine acetate may be mixed with cordage oil and the mixture may be applied to the bag or wrapper as above described. For example, an oil mixture having a 50% content of dodecylamine acetate may be applied to the wrapper or bag. 1½ ounces of the mixture may be applied to one ounce of the textile material. We find, however, that effective results are obtained with a much lesser percentage of dodecylamine acetate in which the oil mixture contains from 3% to 10% (preferably 5% to 10%) of the dodecylamine acetate by weight.

If the dodecylamine acetate is applied to the wrapper or bag without admixture with oil or solvent, the percentages of the dodecylamine acetate may be the same as described above, omitting the oil or solvent.

Testing of the rodent repellent quality of bags and wrapper treated as above will be presently described hereinafter.

In still another embodiment of our invention as shown in Figures 7 and 8, the numeral 8 designates a laminated board consisting of plies 9 which are united by adhesives, resins or any desired material. The numeral 3 indicates dodecylamine acetate as being applied to the outer surface of the board and, if desired, to interior surfaces between the board. It will be understood that the dodecylamine acetate may be incorporated in the adhesive or resin which is employed to unite the plies 9.

In the specific illustration given, the plies 9 may consist of wooden strips or paper strips or compressed fiber strips, etc. Instead of the laminated board, it will be understood that any board forming material or composition may be used. The board may be formed of two paper sheets containing therebetween a corrugated sheet or core and the board may be used for the making of shipping cartons, etc. The board may consist of thin fibrous sheets enclosing a body of inert filler material so as to form a building board, etc. Instead of a laminated fibrous board, a single board consisting of single plies of fiber pressed together may be employed for forming the fabrication board.

In each of the board structures, the dodecylamine acetate may be incorporated within the body of the board as within the exposed surface portions thereof. If desired, the dodecylamine acetate may be applied alone or in a mixture consisting of mineral oils or other desired surfacing liquids.

Since dodecylamine acetate is a solid at ordinary temperatures, it is desirable for the purpose of application to heat the acetate above its melting point so as to form a liquid thereof. The board may be dipped into the hot liquid or the liquid may be sprayed upon the board as desired. It will be understood that the liquid may be applied to the board in any of the conventional methods employed.

When the liquid dodecylamine acetate is applied to an exterior surface of the board, a thin film is formed which persistently clings to the board and forms a thin surface thereon. This film is effective in preventing rodents from approaching the board, the material being effective as a repellent by reason of its effect upon the olfactory senses of the rodent or upon senses other than the sense of taste. At the same time, the material has no unpleasant effect upon the human olfactory sense.

Instead of applying the dodecylamine acetate to an outer surface of the board, it may be applied between the plies of the board or with the cement or adhesive employed for uniting the board partitions. Further, because of its unusual property of high penetrability, the dodecylamine acetate may be caused to enter well into the interior of the fabrication board, etc.

Instead of applying the dodecylamine acetate to the finished board, it is often desirable to add the material to the finish or fiber which is employed for making the board or plies of the board. By this means, the dodecylamine acetate is incorporated deeply within the body of the finished board and exists therein as solid particles which are effective as a permanent means for rendering the board repellent to rodents.

The dodecylamine acetate may be used in very minute amounts to effect the above described advantages. As stated, a thin surfacing film is effective for these purposes. Further, in fibrous containers or board, it is found that from 3% to 10% of the material by weight is effective for rendering the container or board rodent repellent, etc. The same low percentages have been found effective when the dodecylamine acetate is incorporated in the fiber or finish when the paper sheet or board is being formed. It will be understood that larger percentages may be employed if desired but the smaller percentages indicated are effective for the above described purposes.

In testing the above materials for effectiveness in repelling rodents, wild rats were preferably employed as test animals. These were confined in wire cages adjacent a supply of food which was protected from the animals by a separating layer or barrier of the above treated materials.

As a specific example of the performance of a treated bag or container, a textile container was dipped in a solution of isopropyl alcohol 95%-dodecylamine acetate 5%. The treated container was air dried overnight, then filled with compressed pellets of rat food diet and placed in a cage containing two wild rats which had not eaten for 18 hours. It took 48 to 60 hours before the rats pierced the bagging material. Other tests using untreated containers showed that the same were pierced within 6 hours.

A number of tests were carried out with wire cages consisting of two compartments separated by a removable wire partition. The partition or barrier was provided with three openings to permit rats to pass from one compartment of the cage into the other. During these tests, food was kept in one compartment of the cage and wild rats were confined in the other compartment, the openings between the compartments being effectively barred either by windows comprising a network of cord or electrical cable or by barriers of board material. Being thus confined to one of the compartments, the rats instinctively tried to chew through the barrier or window in order to gain entrance into the other compartment. In testing, the three openings were closed with an untreated barrier and a record was made of the time required for the rats to chew through. Under ordinary conditions, this period of time was no longer than twelve hours. This process was then repeated using the barrier formed of treated material.

In specific tests corrugated cardboard was treated with dodecylamine acetate and placed over the windows thereby separating wild rats from a supply of food. The treated board was effective in confining the rats within the compartment for periods of 72 hours.

The rodent repellency of treated binder twine is illustrated by the following example: Binder twine was dipped for 15 seconds in a hot solution of cordage oil (hydrocarbon) 90% and dodecylamine acetate 10%. The treated twine was air-dried for 48 hours. The weight of the twine before treatment was 9.780 grams, and after treatment 11.571 grams. The combined weight of the cordage oil and the dodecylamine acetate was 18.31% of the original weight of the twine. The weight of the dodecylamine acetate was 1.83% of the original weight of the twine, and the weight of the cordage oil was 16.48% of the original weight of the twine. The twine was formed into a barrier as above described and interposed between a rat and a supply of food. The rat failed to cut through the twine for 18 to 24 hours. When the twine was treated in the same manner as above, but the concentration of dodecylamine acetate thereupon was increased to 5.51%, the rat failed to cut through for 52 hours. Rats penetrated untreated twine in less than 12 hours.

In applying the above tests to the cord treated with 50% dodecylamine acetate referred to hereinabove, it was found that rats were confined by the treated cord for a period of 72 hours or more. In some instances, it was found necessary to discontinue the tests in order to avoid loss of rats by starvation.

In testing the repellency of electrical cable treated with dodecylamine acetate as described hereinabove, the electrical cable was secured to metal windows to form networks of cable, and the windows were placed in the openings of a test cage containing rats and a food supply as described above. This prevented the rats from entering one compartment from the other and made it necessary for the rats to chew through the barrier in order to gain access to the second compartment containing the food supply. At the end of 72 hours there was slight to moderate damage in the case of treated cable in contrast to complete cutting away of the insulation in the case of untreated cable.

In addition to the above procedure, other cable tests were conducted. In one procedure, the three openings were closed, using both treated and untreated cables in the same cage at the same time, and in these tests the rats showed an immediate preference for the untreated electrical cable. The repellency in the cable was achieved, while at the same time the cable was not rendered objectionable to the human olfactory senses.

This application is a continuation in part of each of the prior applications filed June 14, 1949, bearing Serial No. 99,066 for Rodent Repellent Cordage, Serial No. 99,067, for Rodent Repellent Electrical Cable, Serial No. 99,068 for Wrapper or Container, and Serial No. 99,069 for Fabrication Board, each application now abandoned.

While we have described the dodecylamine acetate as being applied to finished products such as cordage and textiles, it will be understood that the dodecylamine acetate alone or together with liquid vehicle may be applied to the fibers prior to the time that they are woven into the cord, rope, textile, etc. form.

We have described the use of dodecylamine acetate in connection with cordage, board, textile and cable materials but it will be understood that the same may be used with many other materials to impart therein rodent-repellent characteristics.

While in the foregoing specification, we have set forth illustrative embodiments in considerable detail for the purpose of explaining the invention, it will be understood that such details may be varied widely by those skilled in the art without departing from the spirit of our invention.

We claim:

1. Rodent-repellent fabrication material consisting of fabrication material containing dodecylamine acetate.

2. Rodent-repellent cordage consisting of cordage having incorporated therewith dodecylamine acetate.

3. Rodent-repellent binder twine consisting of binder twine impregnated with dodecylamine acetate.

4. A process for rendering cordage highly repellent to rodents which comprises incorporating with said cordage dodecylamine acetate.

5. A process for rendering binder twine highly repellent to rodents which comprises incorporating with said binder twine dodecylamine acetate.

6. A process for rendering a fabricated material highly repellent to rodents which comprises incorporating with said material dodecylamine acetate.

7. Rodent-repellent sheathing for electrical conductor consisting of sheathing having incorporated therewith dodecylamine acetate.

8. Rodent-repellent fabrication board consisting of a board containing dodecylamine acetate.

9. A rodent-reppelent container consisting of a textile container impregnated with dodecylamine acetate.

10. Rodent-repellent material, comprising a textile body consisting of threads woven into the body impregnated with dodecylamine acetate.

11. In a method for rendering fabrication material rodent-repellent, the steps of melting dodecylamine acetate to form a liquid, impregnating the fabrication material with the liquid dodecylamine acetate, and cooling the dodecylamine acetate to solidify it within the fabrication material.

References Cited in the file of this patent

UNITED STATES PATENTS

| Re. 20,869 | Bousquet | Oct. 4, 1938 |
| 1,653,710 | Kitchin | Dec. 27, 1927 |
| 2,043,941 | Williams | June 9, 1936 |
| 2,222,638 | Szilard | Nov. 26, 1940 |
| 2,247,711 | Ralston | July 1, 1941 |
| 2,471,339 | Minich | May 24, 1949 |
| 2,547,722 | Stewart | Apr. 3, 1951 |
| 2,578,595 | Ralston et al. | Dec. 11, 1951 |

FOREIGN PATENTS

| 441,120 | Great Britain | 1936 |